United States Patent
Petrini

(10) Patent No.: US 8,355,861 B2
(45) Date of Patent: Jan. 15, 2013

(54) AVOIDANCE MANOEUVRE GENERATOR FOR AN AIRCRAFT

(75) Inventor: Erik Petrini, Stockholm (SE)

(73) Assignee: Saab AB, Linköping (SE)

( * ) Notice: Subject to any disclaimer, the term of this patent is extended or adjusted under 35 U.S.C. 154(b) by 777 days.

(21) Appl. No.: 12/612,088

(22) Filed: Nov. 4, 2009

(65) Prior Publication Data

US 2010/0179760 A1   Jul. 15, 2010

(30) Foreign Application Priority Data

Nov. 4, 2008   (EP) ..................... 08168257

(51) Int. Cl.
*G06F 17/10* (2006.01)
(52) U.S. Cl. ........................................ 701/301
(58) Field of Classification Search .................. 701/301
See application file for complete search history.

(56) References Cited

U.S. PATENT DOCUMENTS

| | | | |
|---|---|---|---|
| 6,168,117 B1 * | 1/2001 | Shinagawa .................... | 244/195 |
| 6,510,388 B1 * | 1/2003 | Sporrong et al. ............ | 701/301 |
| 2007/0210953 A1 | 9/2007 | Abraham | |
| 2008/0021647 A1 | 1/2008 | Deveze et al. | |

FOREIGN PATENT DOCUMENTS

| | | | |
|---|---|---|---|
| EP | 0609162 A | 8/1994 | |
| FR | 2876483 A | 4/2006 | |

OTHER PUBLICATIONS

European Search Report—Apr. 15, 2009.

* cited by examiner

*Primary Examiner* — Thomas Tarcza
*Assistant Examiner* — Maceeh Anwari
(74) *Attorney, Agent, or Firm* — Venable LLP; Eric J. Franklin

(57) ABSTRACT

A method for automatically determining an avoidance maneuver in an automatic collision avoidance system of an aircraft. A maximum kinematic acceleration envelope is determined by determining a multitude of avoidance maneuver angle kinematic acceleration pairs in a kinematic acceleration plane, and interpolating gaps between points, thus creating a curve. The curve is called maximum kinematic acceleration envelope. The curve may also be approximated by an analytical expression. An adjusted kinematic acceleration envelope is formed in the plane by forming a new envelope. The new envelope at each point laying closer to or at the same distance from an origin as the points of the maximum kinematic acceleration envelope and such that there is only one value of the kinematic acceleration a for a given avoidance maneuver angle. An avoidance maneuver angle is received for which a suitable bank angle and a suitable normal load is to be determined. Determining The magnitude of the kinematic acceleration a corresponding to the adjusted kinematic acceleration envelope for the avoidance maneuver angle is determined by reading the envelope curve, or if the curve is an analytical expression, calculating the curve by using the analytical expression. The normal load is determined based on the kinematic acceleration, and the avoidance maneuver angle. The bank angle is determined based on the kinematic acceleration and the avoidance maneuver angle.

12 Claims, 8 Drawing Sheets

AVOIDANCE MANOEUVRE GENERATOR FOR AN AIRCRAFT

CROSS-REFERENCE TO RELATED APPLICATIONS

This application claims priority to European patent application 08168257.7 filed 4 Nov. 2008.

TECHNICAL FIELD

The present invention relates to collision avoidance systems for controlling the manoeuvreing of an aircraft to avoid a collision with an object likely to collide with the aircraft if it maintains current course, altitude and speed. In particular it relates to collision avoidance systems for aerial vehicles having limited manoeuvreability. Even in more particular it relates to such systems for Unmanned Aerial Vehicles (UAVs), and Autonomous Aerial Vehicles (AAVs) that can take decisions by themselves without consulting a pilot on the ground, being controlled by limited remote control or no remote control at all.

BACKGROUND

Low manoeuvreability aircraft like UAVs can be remotely controlled or fly autonomously based on pre-programmed flight plans or having more complex dynamic automation systems. UAVs are currently used in a number of military roles, including reconnaissance and attack. They are also used in a small but growing number of civil applications such as fire fighting where a human observer would be at risk, police observation of civil disturbances and crime scenes, and reconnaissance support in natural disasters. UAVs are often preferred for missions that are too "dull, dirty, or dangerous" for manned aircraft.

There is a general desire and requirement that UAVs, in particular civil UAVs, operate safely and do not collide into other UAVs or other aircraft or objects. It is therefore an object of the present invention to provide a system for avoiding the UAV to collide with another object.

For a collision threat sense and avoidance system (sense & avoid system) to actually perform the avoid portion, an aircraft involved must at some point make an avoidance manoeuvre in order to quickly leave the trajectory having a high sensed and/or calculated risk of collision.

In a case where the system utilizes a last instant manoeuvre, i.e., a manoeuvre that is not performed until the very last instant to avoid collision, such manoeuvre must use the maximum safe manoeuvre capability available to the aircraft. For high performance aircraft, there is usually enough manoeuvre performance available to obtain sufficient path curvature by a so called roll-and-pull manoeuvre, in order to quickly leave the trajectory having the sensed and/or calculated risk of collision However, for contemporary UAVs, the manoeuvre performance is generally very poor. In fact, the capabilities are commonly poorer than would be acceptable in a manned aircraft.

Also for other low or medium performance aircraft, manned or not, manoeuvre performance is poor.

One of the functions of a sense & avoid system is to select a suitable manoeuvre to be performed in a case of a potential collision. Such a function may be realised by a manoeuvre generator. For some existing types of system the selection of manoeuvre is limited, e.g. only using pure climb or sink, but typically a high performance sense and avoid system must be able to select a multitude of manoeuvres.

For a high manoeuvreability aircraft, a manoeuvre generator can select the roll-and-pull manoeuvre, since this manoeuvre will adequately fulfill the above requirements. For a low manoeuvreability aircraft however, the manoeuvre generator must operate in some other manner.

US 2007/0210953 discloses an aircraft collision sense and avoidance system and method for UAVs. The system comprises among other things an image sensor connected to a target detection unit further connected to a threat assessment unit for assessing the threat of a target detected in the image provided by the sensor by the target detection unit. An avoidance manoeuvre unit connected to the threat assessment unit provides flight control and guidance with a manoeuvre to avoid any identified collision threat.

U.S. Pat. No. 6,510,388 disclose a system and a method for avoidance of collision between vehicles, wherein a possible avoidance manoeuvre trajectory for the respective vehicle is calculated and compared with the avoidance manoeuvre trajectories calculated for the other vehicles for controlling whether the avoidance manoeuvre trajectory of the vehicle in every moment during its calculated lapse is located at a stipulated or predetermined minimum distance from the avoidance manoeuvre trajectories of the other vehicles. Further, it discloses a method of obtaining suitable avoidance manoeuvre directions for two aircrafts, each provided with the system, and with a communications link between them.

SUMMARY OF THE INVENTION

According to a first aspect there is provided a method for automatically determining an avoidance manoeuvre in an automatic collision avoidance system of an aircraft, the method comprising the following steps:

determining a maximum kinematic acceleration envelope by for a number of avoidance manoeuvre angles determining a corresponding number of corresponding kinematic accelerations in a kinematic acceleration plane, hereby defining a number of points, and interpolating the gaps between the points, thus creating the maximum kinematic acceleration envelope;

forming an adjusted kinematic acceleration envelope in said plane by forming a new envelope, the new envelope at each point laying closer to or at the same distance from the origin as the points of the maximum kinematic acceleration envelope and such that for a given avoidance manoeuvre angle, there is one value of the kinematic acceleration;

Receiving a desired avoidance manoeuvre angle;

Determining the magnitude of the kinematic acceleration corresponding to the adjusted kinematic acceleration envelope for the avoidance manoeuvre angle, by reading the adjusted envelope curve;

Determining the normal load ($n_z$), and the bank angle ($\Phi$) based on the kinematic acceleration ($\alpha$), and the avoidance manoeuvre angle ($\epsilon$);

The maximum kinematic acceleration envelope may approximated by an analytical expression.

The adjusted kinematic acceleration envelope may be approximated by an analytical expression and wherein the kinematic acceleration ($\alpha$) is calculated by using said analytical expression.

The normal load may be determined as a square root expression.

The bank angle may be determined as arcus sinus function of an expression. The normal load ($n_z$) may be determined as $$n_z = \sqrt{\alpha^2 + 2\alpha g \cos\epsilon \cos\theta g^2 \cos^2\theta}$$

The bank angle may be determined as $$\phi = \arcsin\left(\frac{a\sin\epsilon}{n_z}\right)$$

According to a second aspect there is a method provided capable of automatically performing a collision avoidance manoeuvre for selecting the two collision avoidance manoeuvre parameters normal load, and bank angle, the method comprising the following steps:

Receiving a desired avoidance manoeuvre angle $\epsilon$ as an angle in a kinematic acceleration plane Calculating a first transition point as the absolute avoidance manoeuvre angle above which it would be most efficient for the aircraft to do a manoeuvre at maximum bank angle and use a certain normal load to attain the desired avoidance manoeuvre angle, to achieve an avoidance manoeuvre with as much curvature as possible, given the constraints of the aircraft in question, in order to quickly leave a trajectory having great risk of collision.

Calculating a second transition point as the absolute avoidance manoeuvre angle above which it would be more efficient for the aircraft to do a manoeuvre at minimum normal load and use a certain bank angle to attain the desired avoidance manoeuvre angle, to achieve an avoidance manoeuvre with as much curvature as possible, given the constraints of the aircraft in question, in order to quickly leave a trajectory having great risk of collision.;

Comparing the absolute value of the desired avoidance manoeuvre angle $\epsilon$ with the values of the first transition point $\epsilon_{t1}$ and the second transition point $\epsilon_{t2}$ Acting according to one of the following cases Case 1: If the absolute value of desired avoidance manoeuvre angle is greater than zero but less than the value of the first transition point then the suggested parameters for an avoidance manoeuvre is set as follows:
the normal load is set to maximum normal load;
the bank angle is set to a value which would create the desired avoidance manoeuvre angle when executed together with the suggested normal load;

Case 2: If the absolute value of desired avoidance manoeuvre angle $\epsilon$ is greater than the value of the first transition point but less than the value of the second transition point then the suggested parameters for avoidance manoeuvre is set as follows:
the normal load is set to a value, which would create the desired avoidance manoeuvre angle when executed together with the suggested bank angle;
the bank angle is set to maximum allowed bank angle;

Case 3: If the absolute value of desired avoidance manoeuvre angle is greater than the value of the second transition point then the suggested parameters for a collision avoidance manoeuvre is set as follows:
the normal load is set to minimum normal load
the bank angle is set to a value, which would create the desired avoidance manoeuvre angle when executed together with the suggested normal load.

Further is provided a sense and avoidance system for an unmanned aerial vehicle comprising an avoidance manoeuvre parameter generator realizing the steps of the first aspect above.

Still further is provided a sense and avoidance system for a manned aerial vehicle comprising an avoidance manoeuvre parameter generator realizing the steps of the first aspect above.

Finally is provided an avoidance manoeuvre parameter generator realizing the steps of the first aspect above.

According to a final aspect there is provided a sense and avoidance system and an avoidance manoeuvre parameter generator realizing the steps of the second aspect above.

BRIEF DESCRIPTION OF THE DRAWINGS

Preferred embodiments of the invention is described below with the aid of the accompanying drawings, of which

FIG. 1b is a graphical representation of a cascade of avoidance manoeuvre angles in the kinematic acceleration plane of FIG. 1a.

DETAILED DESCRIPTION

The purpose of the invention is to provide a method and a system to select an effective collision avoidance manoeuvre for an aircraft, said aircraft may be a vehicle with limited propulsive power and limited manoeuvreability (limited, e.g., as to magnitude of roll angles), which in turn makes avoidance manoeuvre selection more difficult. Thus, a more particular purpose of the present invention is to provide an effective collision avoidance manoeuvre generator for an UAV with strongly limited propulsive power and limited manoeuvreability.

To maximize the performance of the sense & avoid system, the selected manoeuvres, the inventor has realised, should posses the following qualities:
use maximum or near maximum of the safe physical manoeuvre capabilities.
Cover the full range of possible manoeuvre directions, i.e., all "roll" directions.
Have a gradual change in effectiveness between adjacent manoeuvre directions, to create good conditions for a manoeuvre optimizing routine to operate without problems.

With a "low manoeuvreability aircraft" is for the purpose of the present application meant an aircraft having a limited roll angle, i.e., an aircraft not being able to roll 360 degrees, but instead being able to roll less than 180 degrees to the right and less than 180 degrees to the left. To this category of aircraft belong most UAVs but also most passenger aircraft.

Terminology And Definitions

In the following, for the purposes of the present application, the phrases "collision avoidance manoeuvre", "avoidance manoeuvre", "evasive manoeuvre" and "escape manoeuvre" are used synonymously. So are their corresponding derivatives. The phrases "maximum kinematic acceleration vector envelope", "maximum kinematic acceleration envelope", and "maximum envelope" are used synonymously.

The following symbols are used to denote certain parameters.

| Symbol | Parameter |
|---|---|
| $\epsilon$ (epsilon) | Avoidance Manoeuvre Angle (AMA) - $-\pi \leq \epsilon \leq \pi$, i.e. $-180° \leq \epsilon \leq 180°$ |
| $\epsilon_{t1}$ | Avoidance Manoeuvre Angle at first transition point |
| $\epsilon_{t2}$ | Avoidance Manoeuvre Angle at second transition point |
| $\|\epsilon\|$ | Absolute value of Avoidance Manoeuvre Angle |
| $\Phi$ (fi) | bank angle |
| $\Phi_{max}$ | Maximum allowed bank angle |
| $\theta$ (theta) | pitch angle (angle between longitudinal axis of aircraft and said axis projection onto the ground plane.) |
| a | load |
| g | magnitude of the earths gravitational acceleration |
| $n_z$ | normal load (aircraft fixed coordinates) |
| $n_{z, min}$ | minimum normal load |
| $n_{z, max}$ | maximum normal load |

Note that limitation terms (maximum, minimum) refer to the same for the particular craft in question. The invention will work for any craft, as long as the correct maximum and minimum parameters are used in the calculations.

Figure 1A:
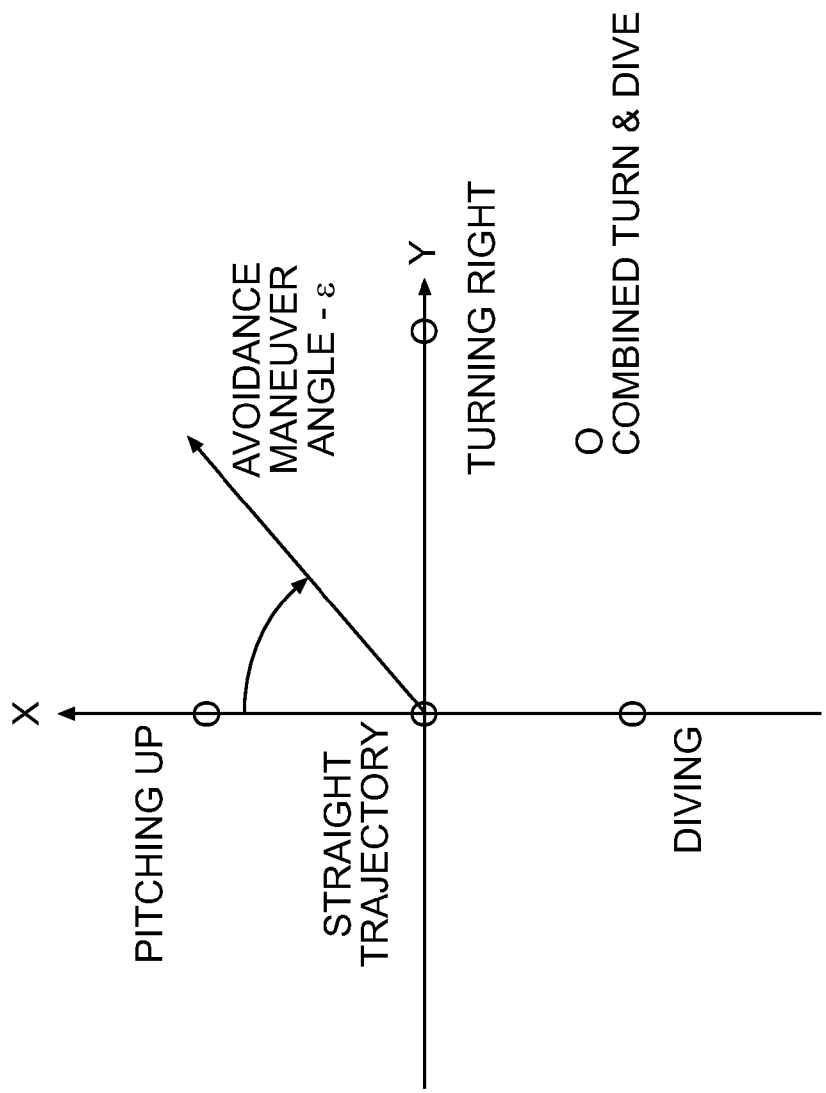
FIG. 1a is a diagram defining a coordinate system and a kinematic acceleration plane in which plane a desired avoidance manoeuvre angle is defined.

With reference now to FIG. 1a and for the purpose of describing a desired avoidance manoeuvre a kinematic acceleration plane is defined, the shorter term "acceleration plane" may be used in the following. The acceleration plane allows us to graphically represent the manoeuvreing capability of the (air)craft for the purpose of avoidance manoeuvreing. In this representation we also implicitly ignore the capability to manoeuvre by reducing or increasing forward thrust, thus simplifying the task of creating manoeuvreing algorithms. The acceleration plane is defined as follows, see also FIG. 1a:

The acceleration plane normal (Z-axle) is along the current velocity vector of the aircraft. (That is, into the paper of FIG. 1a.)

The acceleration plane Y-axle is parallel to the local earth plane, and such that the acceleration plane X-axle will point away from the ground when following the right hand rule. For an aircraft heading straight up or down, the Y-axle is chosen parallel to the body Y-axle to avoid an undefined state.

In an acceleration plane diagram, the state of continuing the current trajectory is found in the origin of the acceleration plane. Pitching the aircraft upward is represented along the X-axle, using an acceleration unit for the magnitude (e.g. m/s² or g:s). Making a coordinated turn to the right is represented along the Y-axle. Combinations of turning and pitching/descending can then be represented in the acceleration plane plot.

In the acceleration plane we also define an Avoidance Manoeuvre Angle (AMA) denoted by the Greek letter $\epsilon$ (epsilon) as the angle around the Z-axle, counted clockwise from the X-axle, in which we would like to consider an avoidance manoeuvre. The Avoidance Manoeuvre Angle is provided from another unit of the sense & avoid system to the manoeuvre generator. Such a unit may suitably function as disclosed in the document U.S. Pat. No. 6,510,388 with or without the following modifications:

In the document is disclosed how to obtain suitable avoidance manoeuvre directions for two aircrafts, each provided with the system, and with a communications link between them. This may be done by minimizing the function $f = \text{sum}(1/(\|C_i - C_j\|))$ over $i$ and $j$, $i \neq j$ where $C_i$ is the completion point (also closest point of approach) of the avoidance manoeuvre trajectory $Tr_i$ for the vehicle "i" with regard to the (avoidance) manoeuvre trajectory $Tr_j$ for the vehicle j. The function f is consequently the sum of the inverted distance between the completion points $C_i$, $C_j$ of the avoidance manoeuvre trajectories $Tr_i$, $Tr_j$ of all vehicles. In the case of a non-cooperative operation where manoeuvre selection of other aircraft are not known, Tr of other aircraft is selected as a straight line in space over time. The vehicle may also be a fixed or slow moving object such as a stationary balloon, paraglider, moving balloon, parachuter, helicopter or the like. For a stationary object Tr is a point in space over time.

A set comprising avoidance manoeuvre directions $D_i$ per participating aircraft is then calculated for which the resulting function f is minimal. Due to calculational constraints it may be required and sufficient to assume a finite number of variations of $D_i$ for each aircraft and chose the respective $D_i$:s for which f is minimized. For the non-cooperative case only the own $D_i$ is calculated since all other objects are assumed to be on a straight trajectory.

The system may easily be expanded for the non-cooperative case to use trajectories other than straight provided this information can be obtained from some sensor or other source of information.

Possible Manoeuvres

Considering an aircraft that is limited by a maximum bank angle and a maximum and a minimum normal load, there are three limit manoeuvres that can be performed. (In this context a limit manoeuvre is a manoeuvre that takes the aircraft to one or more of its limits)

A manoeuvre at maximum normal load, with a varied bank angle.

A manoeuvre at maximum bank angle, with a varied normal load.

A manoeuvre at minimum normal load, with a varied bank angle.

The combination of these three limit manoeuvres allows for a complete revolution of Avoidance Manoeuvre Angles $\epsilon$ to be obtained by the below described procedure. It is assumed that the minimum normal load is greater 0 and that the maximum bank angle is less than 90 degrees.

A) How to Determine Type of Manoeuvre to Use.

Figure 1B:
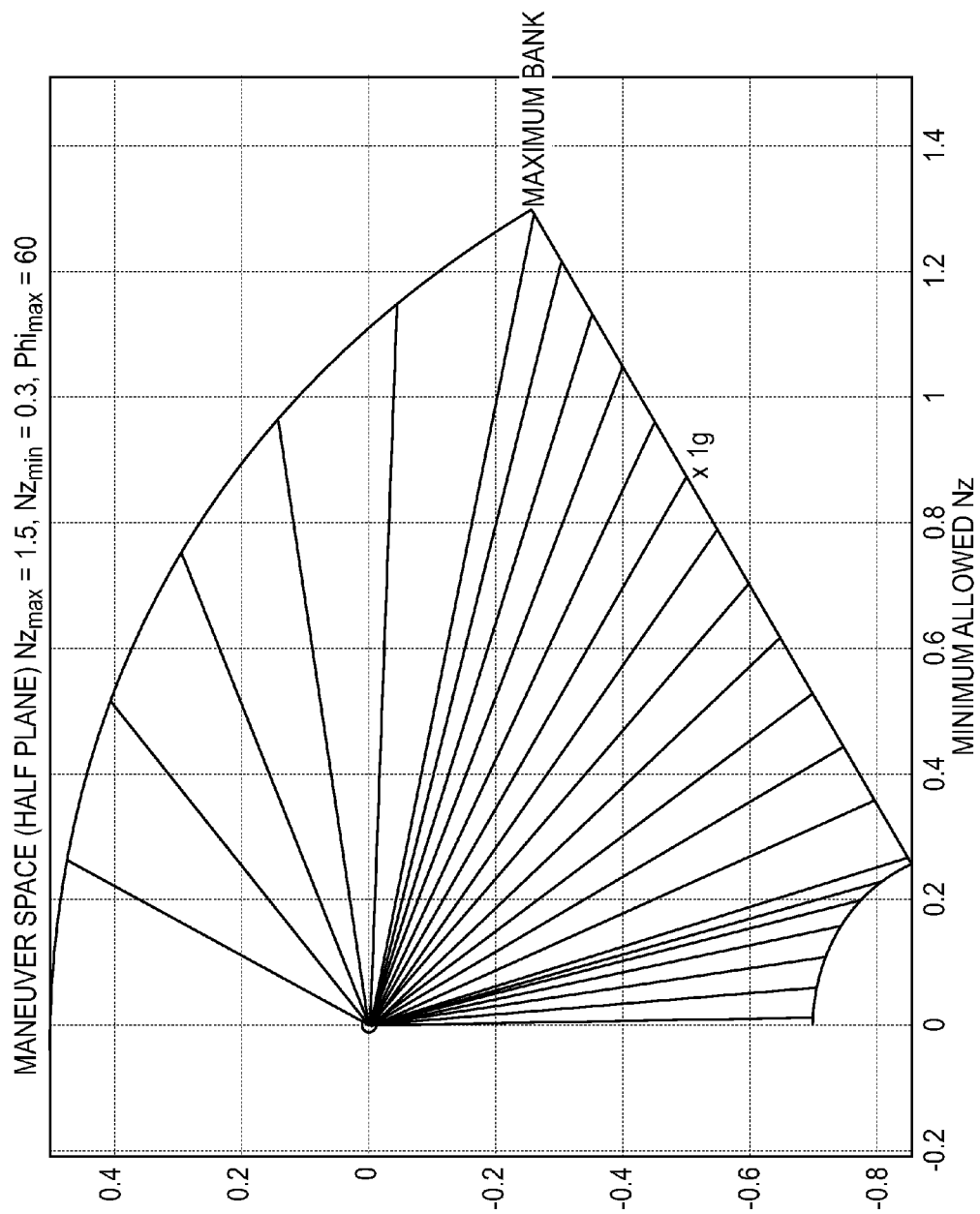

FIG. 1b shows a graphical representation of a cascade of Avoidance Manoeuvre Angles (AMAs) $\epsilon$ in the kinematic acceleration plane and possible for a manoeuvre to the right, $0 <= \epsilon < 180$ degrees. A corresponding figure can be drawn for left hand manoeuvres, $0 > \epsilon > -180$. For descriptive purposes however, only the right hand case will be studied. It is assumed that a desired Avoidance Manoeuvre Angle $\epsilon$ is already determined, for example as described above from U.S. Pat. No. 6,510,388. According to the invention, for a zero Avoidance Manoeuvre Angle $\epsilon$, a maximum normal load manoeuvre will be selected with zero bank angle. For a low Avoidance Manoeuvre Angle $\epsilon$ greater than zero, a maximum normal load manoeuvre will be selected, with a bank angle that gives the desired AMA $\epsilon$. For greater AMAs $\epsilon$, as the angle increases, there will be a first transition point located where the maximum bank angle is reached and the normal load selected by the system will transit from being maximal to be not maximal but reduced, more for greater AMAs. As the AMA increases further, another transition point is found, at which point the normal load will be at its minimum, and the bank angle selected will be varied back to zero.

The transition points are given by:

$\epsilon_{t1} = \arctan_2 (n_{z,max} \sin \phi_{max}, n_{z,max} \cos \phi_{max} - g \cos \phi)$ $\epsilon_{t2} = \arctan_2 (n_{z,min} \sin \phi_{max}, n_{z,min} \cos \phi_{max} - g \cos \phi)$ It is understood from the formulae that a transition point is expressed as an angle. The first transition point $\epsilon_{t1}$ is the point (angle) corresponding to a case where maximum bank angle and maximum normal load under current pitch angle (and speed) are adopted. The $\epsilon_{t1}$-angle may be determined as the arcus tangens two (atan2), wherein the two input arguments to the atan2 function are:

argument 1: a term expressed as maximum normal load $n_{z,max}$ multiplied with the sine of maximum bank angle $\Phi_{max}$ argument 2: a term expressed as the difference between maximum normal load $a_{z,max}$ multiplied with the cosine of maximum bank angle $\Phi$ max and the value of the earths gravity multiplied with the cosine of the current pitch angle $\theta$ The second transition point $\epsilon_{t2}$ is the angle corresponding to a minimum normal load and a maximum bank angle. The $\epsilon_{t2}$-angle may be determined as the arcus tangens two (atan2), wherein the two input arguments to the atan2 function are:

argument 1: a term expressed as minimum normal load $n_{z,min}$ multiplied with the sine of maximum bank angle $\phi_{max}$ argument 2: a term expressed as the difference between the product of minimum normal load $n_{z,min}$ multiplied with the cosine of maximum bank angle $\Phi_{max}$, and the product of the value of the earths gravity multiplied with the cosine of the current pitch angle $\theta$ $|\epsilon| \leq \epsilon_{t1}$, manoeuvre using max normal load, vary bank angle.

$\epsilon_{t1} < |\epsilon| \leq \epsilon_{t2}$, manoeuvre using max bank angle, vary normal load $\epsilon_{t2} < |\epsilon|$, manoeuvre using minimum normal load, vary bank angle.

B) Find the Magnitude of the Parameter to Vary

For each avoidance manoeuvre angle $\epsilon$ there is implicitly a maximum kinematic acceleration $\alpha$ that can be obtained given the limiting maximum bank angle, minimum normal load and maximum normal load. The kinematic acceleration $\alpha$ corresponding to a particular avoidance manoeuvre angle $\epsilon$ may be determined by calculation where it is taken into account the features of the aircraft model in question, or by adequate simulation, or by a combination thereof.

When the kinematic acceleration is determined for each, or a representative number of avoidance manoeuvre angles, a maximum kinetic acceleration envelope can be drawn up in the kinematic acceleration plane using avoidance manoeuvre angle and kinematic acceleration respectively as polar coordinates for points on said envelope. The gap between points can be interpolated.

When manoeuvreing according to the maximum normal load, maximum bank angle or minimum normal load method outlined above the bank angle and normal load can be obtained in closed form without explicitly calculating the resulting kinematical acceleration. How to calculate these parameters follow below.

In the case of maximum normal load:

$|\epsilon| \leq \epsilon_{t1}$ $\phi = \epsilon - \arcsin(g \cos \theta \sin \epsilon / n_z)$ (I)

$n_z = n_{z,max}$

In this case bank angle $\Phi$ is determined as the difference between the avoidance manoeuvre angle $\epsilon$ and an expression taking into account the effect of the g-force. In particular, bank angle may be determined as the difference between the avoidance manoeuvre angle e and a term built from arcus sinus of the product formed by multiplying g with the cosine of the current pitch angle further multiplied with the sine of the avoidance manoeuvre angle $\epsilon$, divided by normal load.

Normal load $n_z$ is determined as maximum normal load for the aircraft model in question.

It may also be advantageous to determine parameters such as maximum normal load, maximum bank angle etc, taking not only into account the situation for the aircraft model in question, but the situation for the particular individual aircraft in question and during the situation of the particular mission.

In the case of maximum bank angle $$\varepsilon_{t1} < |\varepsilon| \leq \varepsilon_{t2} \qquad (II)$$

$$\phi - \text{sgn}(\varepsilon)\phi_{max}$$

$$n_z = \frac{g\cos\theta\sin\varepsilon}{\sin\varepsilon\cos\phi - \cos\varepsilon\sin\phi} = \frac{g\cos\theta\sin\varepsilon}{\sin(\varepsilon - \phi)}$$

In the case of minimum normal load $\epsilon_{t2} < |\epsilon|$ $\phi = \epsilon - \text{sgn}(\epsilon)\pi + \arcsin(g \cos \theta \sin \epsilon / n_z)$ $n_z = n_{z,min}$ The definition of the two argument function arctan$_2$, also known as "atan2" is the conventional one, well known in the art, which can be found in any comprehensive computer science textbook or programming manual. Other mentioned functions are also defined as they conventionally are.

Figure 2:
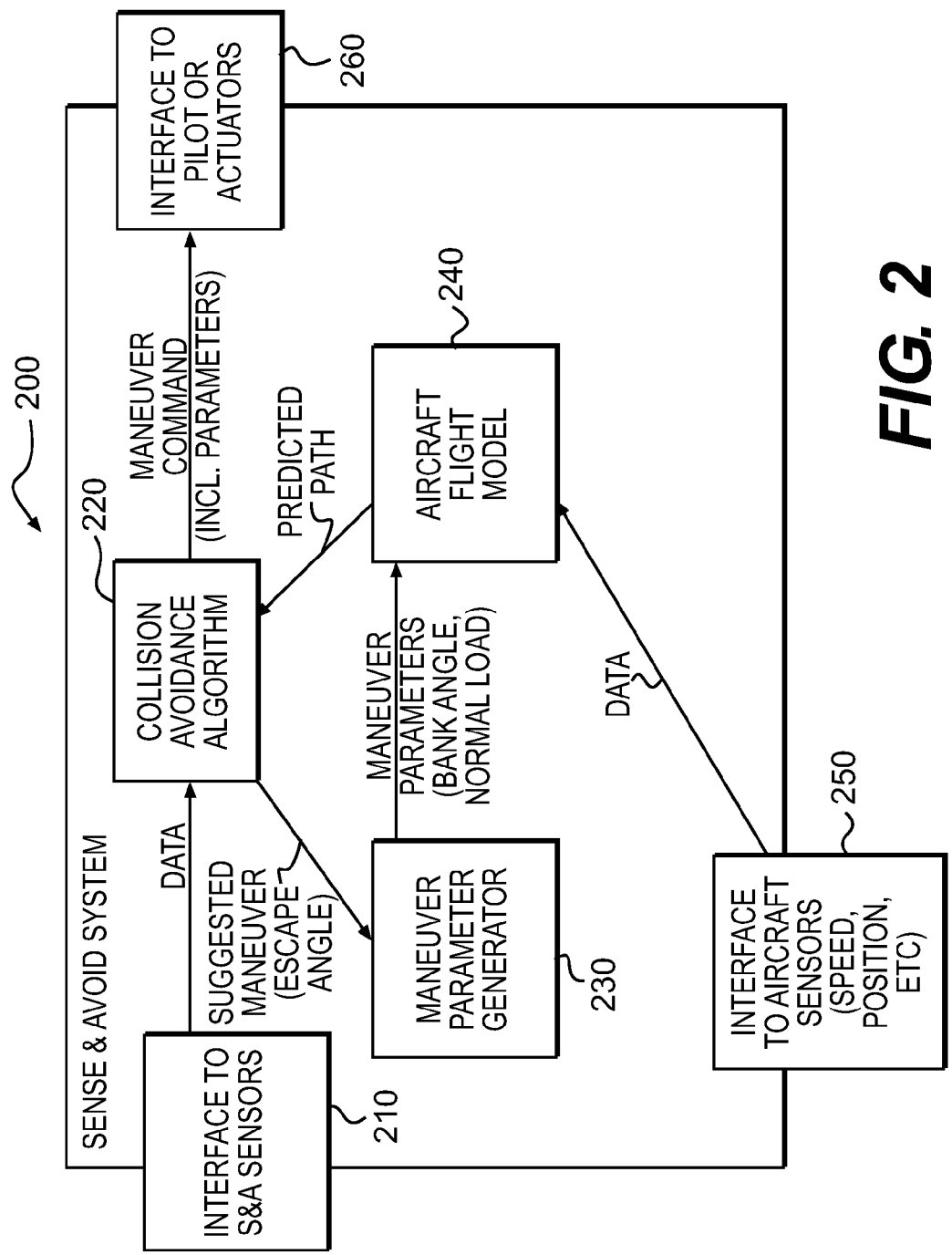
FIG. 2 is a block diagram of a collision avoidance system.

FIG. 2 shows a block diagram of a sense and avoidance system 200 according to the invention, which system comprises the following units:

a S&A interface 210 for interfacing sense and avoidance sensors, such as e.g. radar, TV-camera(s), infrared camera(s), transponder(s) and for providing sense and avoidance data to a collision avoidance algorithm unit 220;

a collision avoidance algorithm unit 220 for calculating, based on sense and avoidance data, a suggested manoeuvre, i.e., an avoidance manoeuvre angle $\epsilon$;

a manoeuvre parameter generator 230 for determining manoeuvre parameters, i.e., for determining a bank angle and a normal load, based on said avoidance manoeuvre angle $\epsilon$;

an aircraft flight model unit 240 for determining, based on the manoeuvre parameters and on aircraft sensor data from aircraft sensors (speed, position etc), a predicted path (cf "Tr" above) of the aircraft for further distribution to the collision avoidance algorithm unit 220;

an aircraft sensors interface unit 250 for interfacing aircraft sensors and to provide aircraft sensor data to the aircraft flight model unit 240;

an aircraft actuator interface unit 260 for receiving manoeuvre command parameters determined by the collision avoidance algorithm unit 220, based on predicted path data sent from the aircraft flight model unit 240 to the collision avoidance algorithm unit 220, and for interfacing aircraft (UAV) actuators.

Avoidance Manoeuvre Parameter Generator

Figure 4:
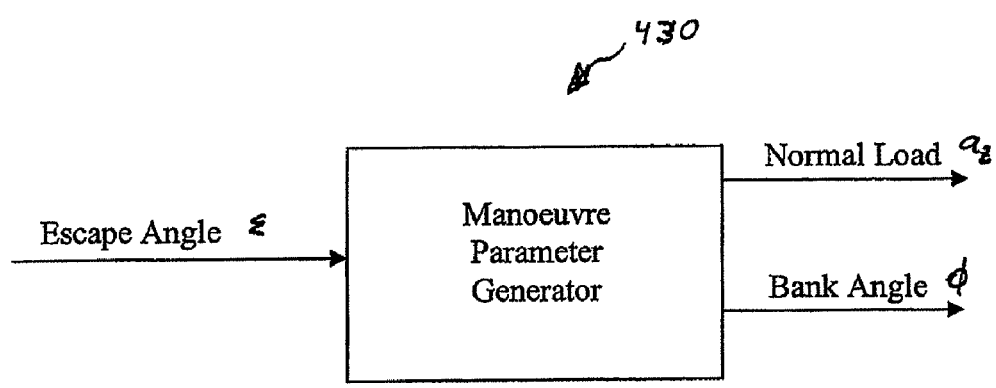
FIG. 4 is a manoeuvre parameter generator with input and outputs

An avoidance manoeuvre parameter generator 230, 430 is provided. The avoidance manoeuvre parameter generator is realizing a method according to the invention for determining manoeuvre parameters (bank angle, normal load) based on a desired escape angle=desired avoidance manoeuvre angle $\epsilon$ as defined above, in the following denoted DAMA. The input to the avoidance manoeuvre parameter generator 230, 430 is thus a first value representing an avoidance manoeuvre angle $\epsilon$. The output from the avoidance manoeuvre parameter generator 230, 430 is thus both a second value representing a normal load $n_z$, and a third value representing a bank angle $\Phi$, see FIG. 4. The method may be realised using computer software or hardware as is known in the art.

Figure 3:
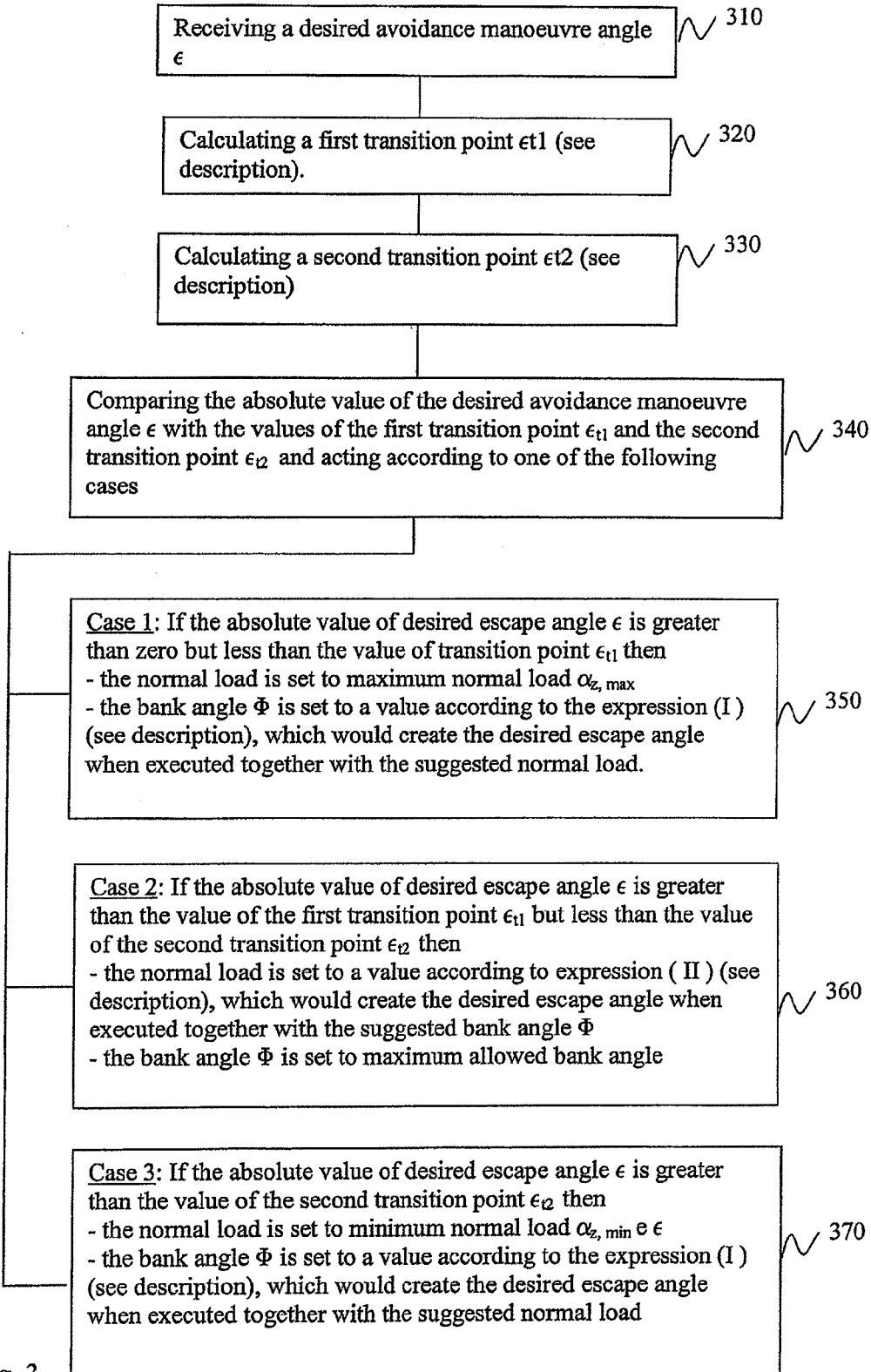
FIG. 3 is a flowchart of a method useable for selecting an avoidance manoeuvre.

With reference to FIG. 3, a method according to the invention may comprise the following steps:

Receiving 310a desired avoidance manoeuvre angle $\epsilon$ representing an angle in an acceleration plane as defined above;

Calculating 320 a first transition point $\epsilon_{t1}$ as the absolute avoidance manoeuvre angle above which it would be most efficient for the aircraft to do a manoeuvre at maximum bank angle and use a certain normal load to attain the desired avoidance manoeuvre angle $\epsilon$, to achieve an avoidance manoeuvre with as much curvature as possible, given the constraints of the aircraft in question, in order to quickly leave a trajectory having great risk of collision.

Calculating 330 a second transition point $\epsilon_{t2}$ as the absolute avoidance manoeuvre angle above which it would be most efficient for the aircraft to do a manoeuvre at minimum normal load and use a certain bank angle to attain the desired avoidance manoeuvre angle $\epsilon$; to achieve an avoidance manoeuvre with as much curvature as possible, given the constraints of the aircraft in question, in order to quickly leave a trajectory having great risk of collision.

Comparing 340 the absolute value of the desired avoidance manoeuvre angle $\epsilon$ with the values of the first transition point $\epsilon_{t1}$ and the second transition point $\epsilon_{t2}$ Acting according to the following cases Case 1: If 350 the absolute value of desired avoidance manoeuvre angle $\epsilon$ is greater than zero but less than the value of transition point $\epsilon_{t1}$ then the suggested parameters for avoidance manoeuvre is set as follows:

the normal load is set to maximum normal load $n_{z,max}$ the bank angle $\Phi$ is set to a value according to the expression (I) above, which would create the desired avoidance manoeuvre angle when executed together with the suggested normal load Case 2: If 360 the absolute value of desired avoidance manoeuvre angle $\epsilon$ is greater than the value of the first transition point $\epsilon_{t1}$ but less than the value of the second transition point $\epsilon_{t2}$ then the suggested parameters for avoidance manoeuvre is set as follows:

the normal load is set to a value according to expression (II) above, which would create the desired avoidance manoeuvre angle when executed together with the suggested bank angle $\Phi$;

the bank angle $\Phi$ is set to maximum allowed bank angle;

Case 3: If 370 the absolute value of desired avoidance manoeuvre angle $\epsilon$ is greater than the value of the second transition point $\epsilon_{t2}$ then the suggested parameters for avoidance manoeuvre is set as follows the normal load is set to minimum normal load $n_{z,min}$;

the bank angle $\Phi$ is set to a value according to the expression (I) above, which would create the desired avoidance manoeuvre angle $\epsilon$ when executed together with the suggested normal load.

Less than Full Manoeuvreing

Sometimes it may prove advantageous not to use the full manoeuvreing capabilities of the aircraft in question. One known reason for this is that an optimizer or an optimizing function of a collision avoidance manoeuvre selector may need a smoother function to work with than that provided by the aforementioned method, otherwise it may happen that a suboptimal Avoidance Manoeuvre Angle eventually may be chosen. There may also be a need to optimize the manoeuvre envelope to provide a bias toward a desired type of avoidance manoeuvres.

However, once the aforementioned method has been used to determine a maximum[kinematic acceleration envelope in the kinematic acceleration plane, this envelope can then be adjusted to any general envelope shape that fulfils the requirements that; there shall only be one magnitude of the kinematic acceleration $\alpha$ for a given Avoidance Manoeuvre Angle $\epsilon$ and such an adjusted envelope described shall lie inside the maximum envelope formed by the aforementioned method. An adjusted envelope may be an analytical function or a tabulated function. The selection of the envelope may be manual or it may be optimized by automated means such as for example parameter variation using a steepest gradient method.

Figure 5:
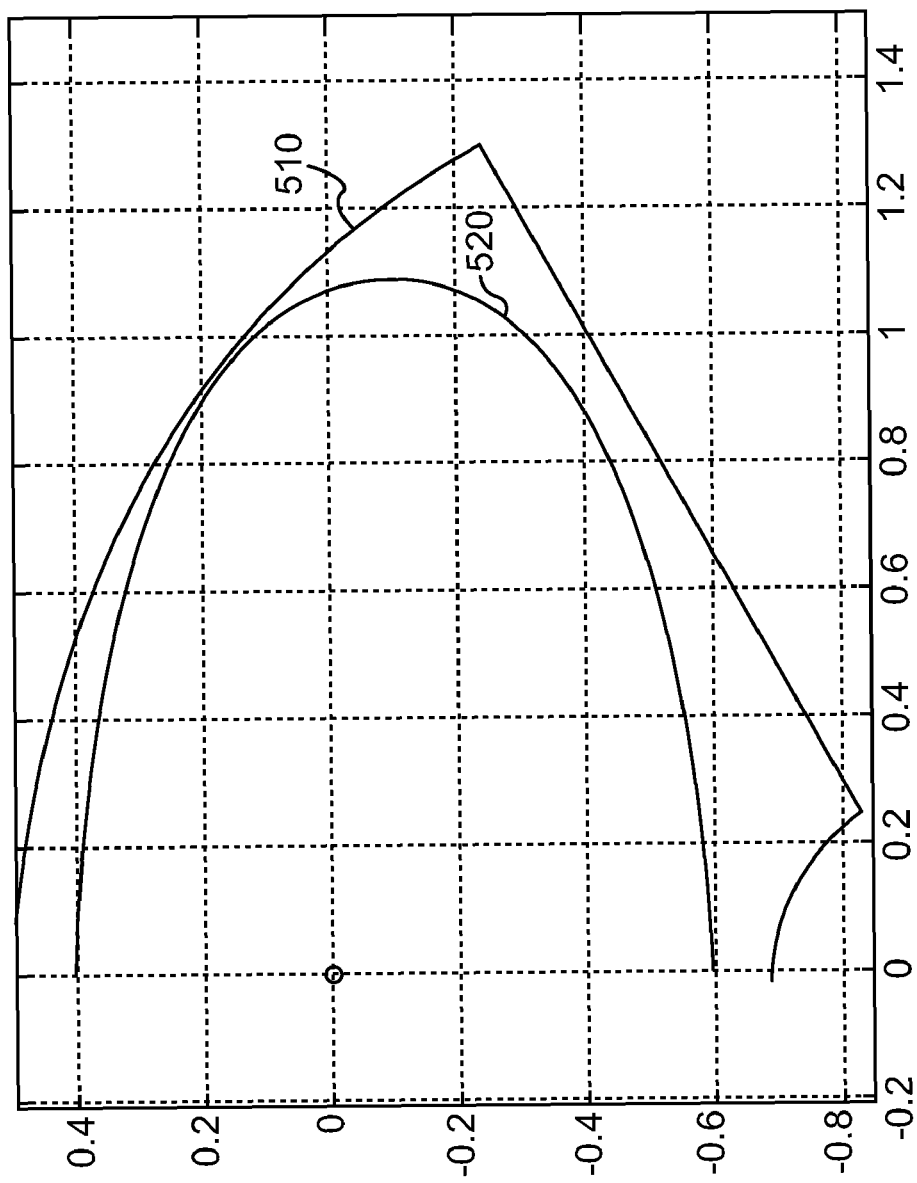
FIG. 5 shows a maximum and an adjusted kinematic acceleration vector envelope.

FIG. 5 shows one such adjusted envelope 520 which is formed by defining an ellipse that lies within the maximum envelope 510. Again only the right hand side of the acceleration plane is illustrated. This exemplary envelope is thus described by the ellipse formula:

$$x = A\cos\epsilon + h$$

$$y = B\sin\epsilon + k$$

Where A and B are the magnitudes of the half axis and h and k are offsets of the ellipse foci. For the FIG. 5 the exemplary values for illustration is selected as:
A=0.5 g
B=1.1 g
h=−0.1 g
k=0.0 g After such an envelope has been defined, the manoeuvre parameters as per above is selected by determining the magnitude of the kinematic acceleration $\alpha$ to the defined envelope for a given Avoidance Manoeuvre Angle $\epsilon$ In the exemplary case of the ellipse envelope the magnitude is then described by:

$$\alpha = \sqrt{(A\cos\epsilon + h)^2 + (B\sin\epsilon + k)^2}$$

After the magnitude of the kinematic acceleration $\alpha$ has been determined the manoeuvreing parameters can regardless of the shape of the envelope be determined by the steps:

$$n_z = \sqrt{a^2 + 2ag\cos\varepsilon\cos\theta + g^2\cos^2\theta}$$

$$\phi = \arcsin\left(\frac{a\sin\varepsilon}{n_z}\right)$$

Other Cases of Less than Full (Limit) Manoeuvreing

Figure 6:
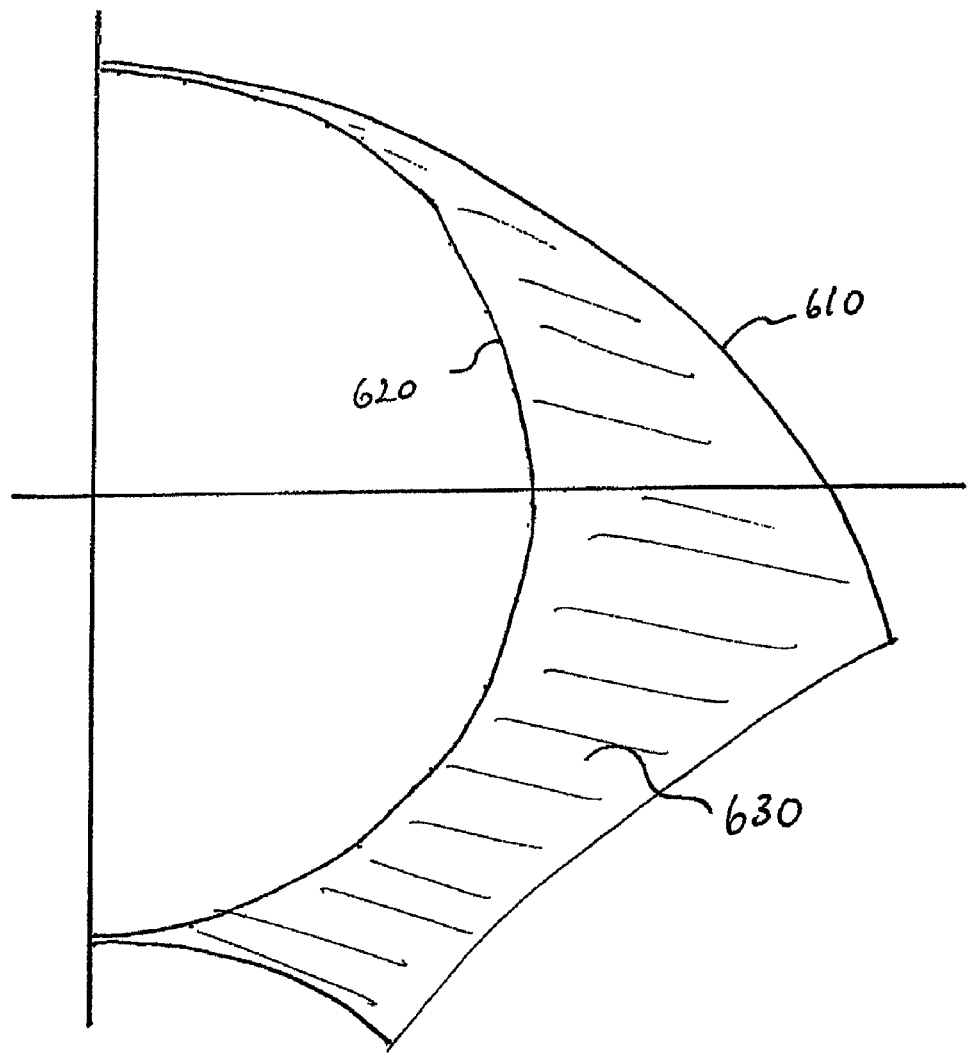
FIGS. 6, 7 and 8 shows three cases of a kinematic acceleration diagram wherein an area is delimited between two kinematic acceleration envelopes
Figure 8:
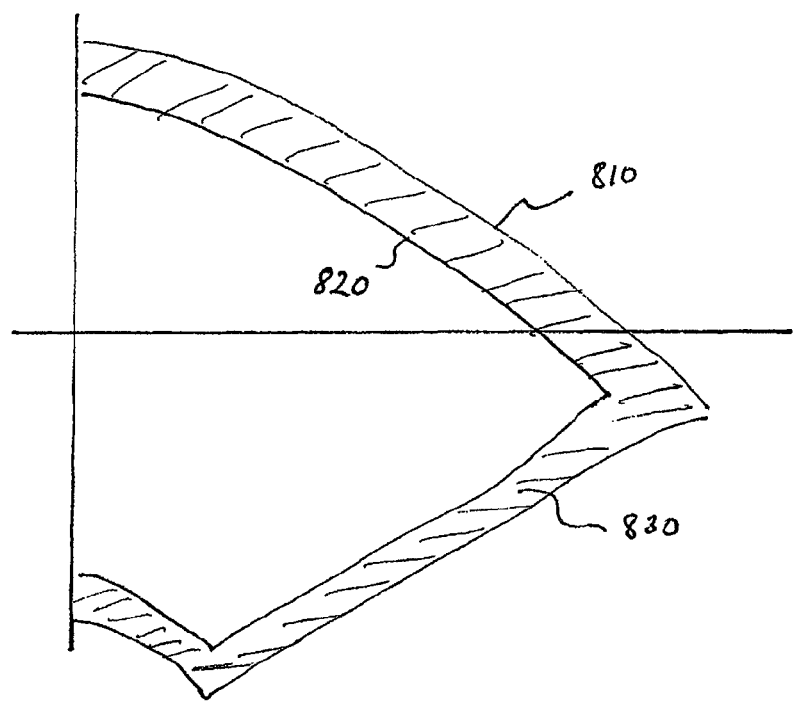
Figure 7:
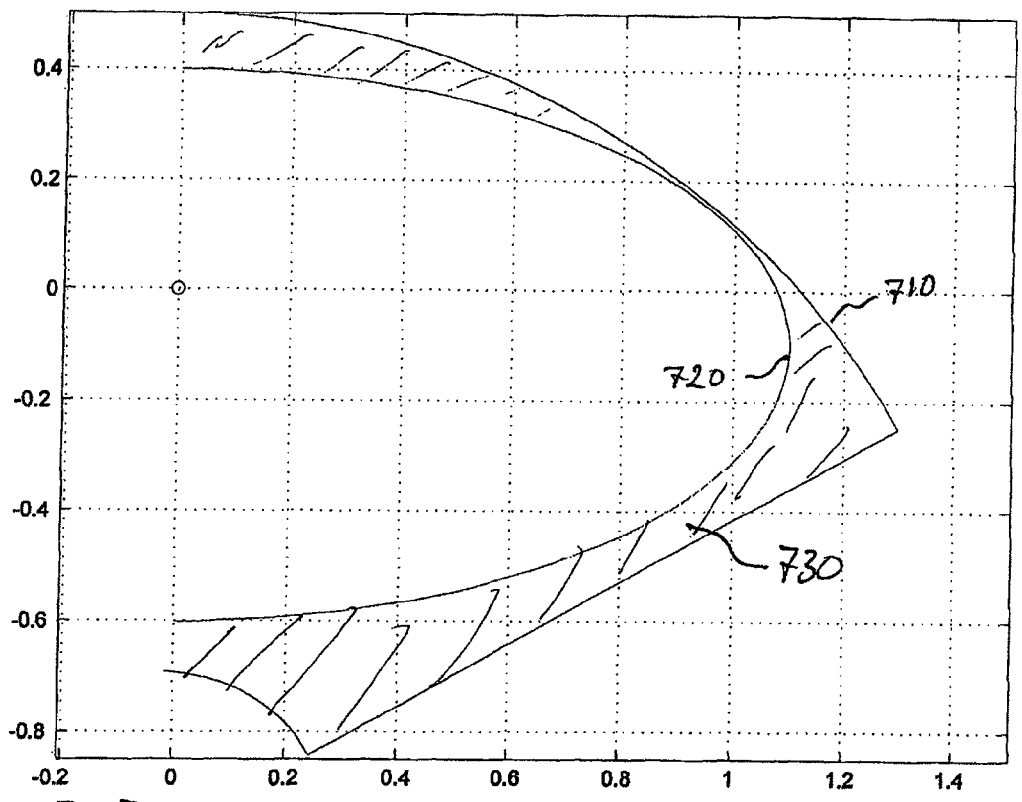

An adjusted kinematic acceleration envelope may be created in the kinematic acceleration plane by forming a new envelope, the new envelope at each point laying closer to or at the same distance from the origin (0,0) as the points of the maximum kinematic acceleration envelope and such that there is only one value of the kinematic acceleration a for a given avoidance manoeuvre angle $\epsilon$. In FIGS. 6, 7 and 8 are shown examples of areas within the kinematic acceleration plane where it is suitable according to the invention to locate such an adjusted kinematic acceleration envelope.

FIG. 6 shows a kinematic acceleration diagram wherein an area 630 between the maximum kinematic acceleration envelope 610 and a circular adjusted kinematic acceleration envelope 620 is delimited. Good avoidance manoeuvre determining methods according to the present invention is obtained by locating the kinematic acceleration envelope for selecting kinematic acceleration, and the therewith associated normal load, and bank angle, within the area limited by these two boundary curves.

FIG. 7 shows a kinematic acceleration diagram wherein an area 730 between the maximum kinematic acceleration envelope 710 and an elliptic adjusted kinematic acceleration envelope 720 is delimited. High performance avoidance manoeuvre determining methods according to the present invention is obtained by locating the kinematic acceleration envelope for selecting kinematic acceleration, and the therewith associated normal load, and bank angle, within the area limited by these two boundary curves.

FIG. 8 shows a kinematic acceleration diagram wherein an area 830 is delimited between the maximum kinematic acceleration envelope 810 and a similar shaped adjusted kinematic acceleration envelope 820 constituted of a 5 to 10 percent reduced version of the maximum kinematic acceleration envelope 810. High performance avoidance manoeuvre determining methods according to the present invention can also be obtained by locating the kinematic acceleration envelope for selecting kinematic acceleration, and the therewith associated normal load, and bank angle, within the area limited by these two boundary curves.

The invention claimed is:

1. A method to carry out in a computer for automatically determining an avoidance manoeuvre in an automatic collision avoidance system of an aircraft, the method comprising:
   determining, by said computer, a maximum kinematic acceleration envelope for a number of avoidance manoeuvre angles by determining a corresponding number of corresponding kinematic accelerations in a kinematic acceleration plane, hereby defining a number of points, and interpolating the gaps between the points, thus creating the maximum kinematic acceleration envelope;
   forming, by said computer, an adjusted kinematic acceleration envelope in said aircraft by forming a new envelope, the new envelope at each point laying closer to or at the same distance from the origin as the points of the maximum kinematic acceleration envelope and such that for a given avoidance manoeuvre angle ($\epsilon$), there is one value of the kinematic acceleration (a);
   receiving, by said computer, a desired avoidance manoeuvre angle ($\epsilon$);
   determining, by said computer, the magnitude of the kinematic acceleration (a) corresponding to the adjusted kinematic acceleration envelope for the avoidance manoeuvre angle ($\epsilon$), by reading the adjusted envelope curve;
   determining, by said computer, a normal load ($n_z$), and a bank angle ($\phi$) based on the kinematic acceleration (a), and the avoidance manoeuvre angle ($\epsilon$); and guiding the aircraft in accordance with the generated avoidance manoeuver.

2. The method according to claim 1, wherein the maximum kinematic acceleration envelope is approximated by an analytical expression.

3. The method according to claim 1, wherein the adjusted kinematic acceleration envelope is approximated by an analytical expression and wherein the kinematic acceleration (a) is calculated by using said analytical expression.

4. The method according to claim 1, wherein the normal load ($n_z$) is determined as a square root expression.

5. The method according to claim 1, wherein the bank angle is determined as arcus sinus function of an expression.

6. The method according to claim 4, wherein the normal load ($n_z$) is determined as $$n_z = \sqrt{a^2 + 2ag\cos\epsilon\cos\theta + g^2\cos^2\theta}.$$

7. The method according to claim 5, wherein the bank angle ($\Phi$) is determined as $$\phi = \arcsin\left(\frac{a\sin\epsilon}{n_z}\right).$$

8. The method according to claim 1, for an aircraft capable of automatically performing a collision avoidance manoeuvre for selecting the two collision avoidance manoeuvre parameters normal load, and bank angle, further comprising:
   receiving a desired avoidance manoeuvre angle $\epsilon$ as an angle in a kinematic acceleration plane;
   calculating a first transition point ($\epsilon_{t1}$) as the absolute avoidance manoeuvre angle above which it would be most efficient for the aircraft to do a manoeuvre at maximum bank angle and use a normal load to attain the desired avoidance manoeuvre angle ($\epsilon$), to achieve an avoidance manoeuvre with a maximum curvature, given the constraints of the aircraft in question, in order to quickly leave a trajectory having great risk of collision;
   calculating a second transition point ($\epsilon_{t2}$) as the absolute avoidance manoeuvre angle above which it would be more efficient for the aircraft to do a manoeuvre at minimum normal load and use a bank angle to attain the desired avoidance manoeuvre angle ($\epsilon$), to achieve an avoidance manoeuvre with the maximum curvature, given the constraints of the aircraft in question, in order to quickly leave a trajectory having great risk of collision;
   comparing the absolute value of the desired avoidance manoeuvre angle $\epsilon$ with the values of the first transition point $\epsilon_{t1}$ and the second transition point ($\epsilon_{t2}$)
   acting according to one of the following cases
   Case 1: If the absolute value of desired avoidance manoeuvre angle $\epsilon$ is greater than zero but less than the value of transition point ($\epsilon_{t1}$) then the suggested parameters for avoidance manoeuvre is set as follows:
   the normal load is set to maximum normal load ($n_{z,max}$);
   the bank angle ($\Phi$) is set to a value which would create the desired avoidance manoeuvre angle when executed together with the suggested normal load;
   Case 2: If the absolute value of desired avoidance manoeuvre angle $\epsilon$ is greater than the value of the first transition point $\epsilon_{t1}$ but less than the value of the second transition point $\epsilon_{t2}$ then the suggested parameters for avoidance manoeuvre is set as follows:
   the normal load is set to a value, which would create the desired avoidance manoeuvre angle when executed together with the suggested bank angle ($\Phi$);
   the bank angle ($\Phi$) is set to maximum allowed bank angle ($\Phi_{max}$)
   Case 3: If the absolute value of desired avoidance manoeuvre angle ($\epsilon$) is greater than the value of the second transition point ($\epsilon_{t2}$) then the suggested parameters for collision avoidance manoeuvre is set as follows:
   the normal load is set to minimum normal load ($n_{z,min}$) the bank angle ($\Phi$) is set to a value, which would create the desired avoidance manoeuvre angle when executed together with the suggested normal load.

9. A sense and avoidance system for an aerial vehicle, comprising:
an avoidance manoeuvre parameter generator configured to carry out in a computer a method comprising
determining, by said computer, a maximum kinematic acceleration envelope for a number of avoidance manoeuvre angles by determining a corresponding number of corresponding kinematic accelerations in a kinematic acceleration plane, hereby defining a number of points, and interpolating the gaps between the points, thus creating the maximum kinematic acceleration envelope,
forming, by said computer, an adjusted kinematic acceleration envelope in said plane by forming a new envelope, the new envelope at each point laying closer to or at the same distance from the origin as the points of the maximum kinematic acceleration envelope and such that for a given avoidance manoeuvre angle ($\epsilon$), there is one value of the kinematic acceleration (a),
receiving, by said computer, a desired avoidance manoeuvre angle ($\epsilon$),
determining, by said computer, the magnitude of the kinematic acceleration (a) corresponding to the adjusted kinematic acceleration envelope for the avoidance manoeuvre angle (e), by reading the adjusted envelope curve, and
determining, by said computer, a normal load ($n_z$), and a bank angle ($\phi$) based on the kinematic acceleration (a), and the avoidance manoeuvre angle ($\epsilon$).

10. The sense and avoidance system according to claim 9, wherein the aerial vehicle is manned.

11. An avoidance manoeuvre parameter generator for carrying out the method according to claim 1.

12. The sense and avoidance system according to claim 9, wherein the aerial vehicle is unmanned.

* * * * *